United States Patent Office 3,293,548
Patented Dec. 20, 1966

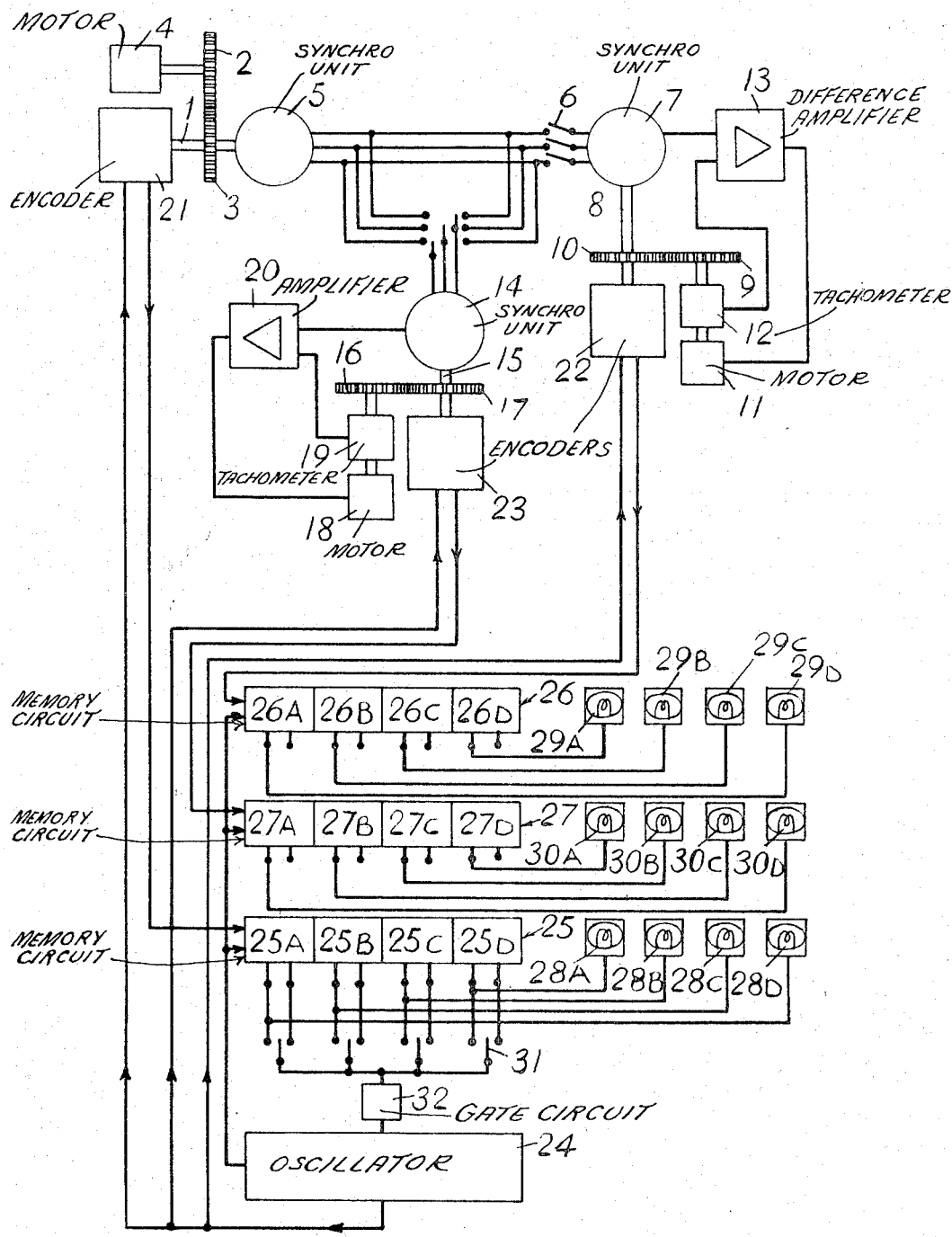

3,293,548
MEANS FOR TESTING APPARATUS WHICH CAUSES A ROTATABLE SHAFT TO FOLLOW THE MOVEMENTS OF ANOTHER ROTATABLE SHAFT
Dennis Albert Hunt, Northolt, Middlesex, England, assignor to Rotax Limited, London, England
Filed Dec. 10, 1962, Ser. No. 243,409
Claims priority, application Great Britain, Dec. 8, 1961, 43,982/61
5 Claims. (Cl. 324—158)

This invention relates to apparatus for correlating the angular positions of a pair of rotatable shafts, the apparatus being of the kind including a first synchro unit for producing an electrical output of magnitude depending on the angular position of the first shaft, and a second synchro unit to which the output is fed, said second unit serving to move the second shaft angularly so that the angular positions of the shafts are correlated.

In testing such apparatus it is necessary to determine whether the second shaft follows the first shaft accurately, and it is desirable therefore to test the apparatus whilst the shafts are actually rotating, otherwise it may occur that the second shaft is not following the first shaft accurately but catches up with the first shaft when the first shaft is stopped but before testing is carried out.

A method in accordance with the invention comprises rotating the first shaft, obtaining at successive spaced instants of time first and second digital signals representing the angular positions of the first and second shafts respectively, feeding the digital signals to first and second memory units which store the signals until further signals are received, at which point the previous signals are cancelled and the further signals are stored, and ceasing testing when a selected one of the digital signals has a predetermined value.

Means in accordance with the invention comprises in combination a pair of encoders which when energized produce digital signals representing the angular positions of the first and second shafts respectively, control means for energizing the encoders simultaneously at predetermined spaced instants of time, a pair of memory units which store signals received from the encoders when the control means is operated until the control means is operated a second time, at which point the stored signals are cancelled and the new signals are stored, a pair of display units for indicating the signals stored in the memory units, and adjustable switch means which when the signal received by the memory unit associated with a selected one of the shafts has a predetermined value operates the control means to prevent further energization of the encoders.

The accompanying drawing is a diagrammatic representation of one example of the invention.

Referring to the drawing, there is provided a shaft 1 which is driven through gearing 2, 3 by a D.C. motor 4. The angular position of the shaft 1 is sensed in well known manner by a synchro unit 5 the output from which is fed through a switch 6 to a remote synchro unit 7 which controls the angular position of a shaft 8 in accordance with the signal received from the unit 5, so that the shaft 8 follows the shaft 1 within the limitations imposed by the accuracy of the system. The synchro units are very well known devices and are not therefore described in detail. As is well known, synchro units in this type of apparatus obtain electrical signals representing an angular position of a shaft and can use these signals to cause movement of another shaft. Preferably a servo system is provided for effecting movement of shaft 8, this system comprising gearing 9, 10 driven by a motor 11, a tachometer 12 on the motor shaft, and a difference amplifier 13 which receives inputs from the unit 7 and tachometer 12, and provides an output for operating the motor 11.

The apparatus thus far described is known, the remaining apparatus being added for testing purposes.

The testing equipment includes a synchro unit 14 which can be connected to the output from unit 5, the input to unit 7, or to any intermediate point. The components associated with the unit 14 are similar to those associated with the unit 7, namely a shaft 15, gearing 16, 17, a motor 18, tachometer 19 and amplifier 20.

Associated with shafts 1, 8, 15 are three encoders 21, 22, 23. Each encoder includes a disc secured to the appropriate shaft and having a plurality, for example, thirteen, annular bands consisting of circumferentially spaced transparent and opaque positions. At one side of the disc is a radially extending light source, and at the other side of the disc opposite the light source are thirteen light-sensitive devices which are energised when illuminated. The arrangement is such that when the light source is illuminated the state of energisation of the devices gives a binary indication of the angular position of the shaft. These encoders are well known in the art for giving a binary indication of the angular position of a shaft and give this indication with an accuracy depending on the number of bands used. For example, if a disc had one band only which was half opaque and half transparent, the accuracy would be within 180° only, because when the light source was illuminated the single light-sensitive device would be energised with the shaft in 180° region, and not energised with the shaft in the other 180° region. With two bands 90° accuracy is obtained, and so forth.

The three light sources associated with the encoders 21, 22, 23 are energised periodically by a conventional oscillator 24. The outputs from the encoders are used to switch memory circuits 25, 26, 27 respectively. These circuits each consist of thirteen bistables, but for simplicity only four bistables of each are shown and are designated with the reference numerals of the circuits followed by suffixes A, B, C and D. The bistables 25A to 25D respectively serve when in one state to illuminate lamps 28A to 28D, so that these lamps indicate the state of the circuit 25. Similarly, the states of the circuits 26, 27 are indicated by the lamps 29A to 29D and 30A to 30D respectively.

The outputs from the bistables 25A to 25D are connectible through switches 31 to a known form of gate circuit 32 which conducts to provide an output to the oscillator 24 only when it receives an input through each switch 31. The switches 31 can be set to conduct when the bistables 25A to 25D are in predetermined states corresponding to a predetermined angular position of the shaft 1. When the bistables are in the predetermined state the circuit 32 receives inputs through all of the switches 31, and produces an output which halts operation of the oscillator 24.

In order to test the apparatus a predetermined position of the shaft 1 is selected by connecting each of the switches 31 to its respective bistables so that the circuit 32 is energised when the shaft 1 is in said predetermined position, provided that the light source in the encoder 1 is illuminated at that instant. The apparatus is then allowed to operate with the unit 14 connecting to the outpunt from unit 5. When the shaft occupies the predetermined position at the same instant as the oscillator 24 illuminates the light sources, the apparatus stops but the shafts continue to rotate. The chosen position of the shaft 1 is now indicated by the lamps 28A to 28D. If the shaft 8 is following the shaft 1 accurately, the lamps 29A to 29D will be illuminated or extinguished on the same order as the lamps 28A to 28D. However, if there is a fault the order of illumination will be different, and in this case the order of illumination of the lamps 30A to 30D will give some guidance as to where the error lies. If the lamps 30A to 30D are illuminated in the same order as the lamps 28A to 28D, then the unit 5 is working satisfactorily. The unit 14 can now be connected to the input to unit 7, and if the lamps 30A to 30D are still illuminated in the same order as the lamps 28A to 28D, the unit 7 must be faulty. If the lamps 30A to 30D are illuminated in the same order as the lamps 29A to 29D, the fault must lie between the units 5, 7. The exact location of the fault can be determined by connecting the unit 14 to various points between the units 5, 7 and taking further readings thus, if one point is found at which lamps 30 and lamps 28 are illuminated in the same order, and an adjacent point is found at which lamps 30, 29 are illuminated in the same order, the fault must lie between these two points.

Where the encoders have thirteen bands on the disc, the position of the shaft 1 at which a reading is taken can be set very accurately by the switches 31. However, as explained above, there will be a delay before a reading is taken, because the light source must be illuminated at the exact instant when the shaft is in the predetermined position. This delay can be reduced by arranging that one or more of the switches 31 corresponding to the least significant bands of the disc play no part in the operation. The effect of this will be that the apparatus will stop when the light sources are illuminated with the shaft 1 within a predetermined sector. It should be appreciated, however, that the accuracy of the readings is unimpaired.

The method of and means for testing would still be of some considerable use without the additional unit 14 and associated components, although in this case there would be no way of finding the location of a fault. Moreover, although in the example described readings are taken when the shaft 1 is in a predetermined position, the switches 31 could be associated with either of the circuits 26, 27 so that readings are taken when either the shaft 8 or the shaft 15 is in a predetermined position.

Having thus described my invention what I claim as new and desire to secure by Letters Patent is:

1. Means for testing apparatus for correlating the angular positions of first and second rotatable shafts, the apparatus being of the kind including a first synchro unit for producing an electrical output of magnitude dependent on the angular position of the first shaft, a second synchro unit to which the output is fed, and a motor operable by said second unit for moving the second shaft angularly so that the angular positions of the shafts are correlated, the means comprising a third synchro unit and associated third shaft connected to a point intermediate the first and second synchro units, first, second and third encoders associated with the first, second and third shafts respectively and serving when energised to produce digital signals representing the angular positions of the first, second and third shafts, an oscillator for energising said encoders simultaneously once in each cycle of the oscillator, first, second and third memory units connected respectively to the first, second and third encoders, each of said memory units comprising a number of bistable circuits corresponding to the number of digits in each digital signal produced by each encoder, and the digits serving respectively to set said bistable circuits to one or the other of their stable states each time said oscillator energises the encoders, the arrival of digital signals at a bistable circuit serving to cancel any signals previously stored, first, second and third display units connected to the first, second and third memory units respectively for indicating the signals stored in the memory units, and adjustable switch means which when the signal received by a selected one of the memory units has a predetermined value operates the control means to prevent further energisation of the encoders.

2. Means as claimed in claim 1 including adjustable connecting means whereby the third synchro unit can be connected alternatively to at least two points between the first and second synchro units.

3. Means as claimed in claim 1 in which each display unit consists of a number of lamps connected to the bistable circuits respectively so as to be illuminated only when the respective bistable circuit is in one of its stable states.

4. Means as claimed in claim 1 in which the adjustable switch means comprises a plurality of switches connectable to the bistable circuits of the first memory unit so that the switches receive a signal when the appropriate bistable is in a selected state, the testing means further including means for operating the control means to prevent further energisation of the encoders only when all of the switch means receive signals.

5. Means as claimed in claim 4 in which the number of switches is fewer than the number of bistable circuits so that the angular position of the first shaft at which testing takes place is predetermined only within a sector.

References Cited by the Examiner
UNITED STATES PATENTS

| | | | |
|---|---|---|---|
| 2,402,108 | 6/1946 | Willard | 324—158 |
| 2,966,671 | 12/1960 | Abbott | 340—347 |
| 3,024,986 | 3/1962 | Strianese et al. | 250—233 |
| 3,134,073 | 5/1964 | Dickerson | 324—158 |

WALTER L. CARLSON, *Primary Examiner.*

FREDERICK M. STRADER, RUDOLPH V. ROLINEC,
*Examiners.*

C. W. HOFFMANN, E. L. STOLARUN,
*Assistant Examiners.*